(12) United States Patent
Yavari et al.

(10) Patent No.: US 12,233,624 B2
(45) Date of Patent: Feb. 25, 2025

(54) VEHICLE LAMINATED GLAZING AND DEVICE WITH ASSOCIATED NEAR INFRARED VIEWING SYSTEM

(71) Applicant: SAINT-GOBAIN GLASS FRANCE, Courbevoie (FR)

(72) Inventors: Keihann Yavari, Margny-les-Compiegne (FR); Claire Davis, Compiegne (FR); Pauline Girard, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/761,649

(22) PCT Filed: Sep. 18, 2020

(86) PCT No.: PCT/EP2020/076099
§ 371 (c)(1),
(2) Date: Mar. 18, 2022

(87) PCT Pub. No.: WO2021/053138
PCT Pub. Date: Mar. 25, 2021

(65) Prior Publication Data
US 2022/0388281 A1  Dec. 8, 2022

(30) Foreign Application Priority Data
Sep. 20, 2019  (FR) ...................................... 1910385

(51) Int. Cl.
| | | |
|---|---|---|
| *B32B 17/10* | (2006.01) | |
| *B32B 3/26* | (2006.01) | |
| *B32B 27/08* | (2006.01) | |
| *B32B 27/30* | (2006.01) | |
| *B60J 1/00* | (2006.01) | |
| *B60J 3/00* | (2006.01) | |
| *C03C 17/36* | (2006.01) | |
| *B32B 27/36* | (2006.01) | |
| *B60R 11/04* | (2006.01) | |

(52) U.S. Cl.
CPC ........ *B32B 17/10036* (2013.01); *B32B 3/266* (2013.01); *B32B 17/10761* (2013.01);
(Continued)

(58) Field of Classification Search
CPC ............. B32B 17/10568; B32B 3/263; B32B 17/10036; B32B 17/10761; B32B 27/30;
(Continued)

(56) References Cited

U.S. PATENT DOCUMENTS

| | | | |
|---|---|---|---|
| 5,239,406 A | * | 8/1993 | Lynam ............. B32B 17/10339 359/275 |
| 6,132,882 A | | 10/2000 | Landin et al. |

(Continued)

FOREIGN PATENT DOCUMENTS

| | | |
|---|---|---|
| CN | 101037099 A | 9/2007 |
| CN | 101678651 A | 3/2010 |

(Continued)

OTHER PUBLICATIONS

International Search Report as issued in International Patent Application No. PCT/EP2020/076099, dated Dec. 3, 2020.
(Continued)

*Primary Examiner* — Megha M Gaitonde
(74) *Attorney, Agent, or Firm* — Pillsbury Winthrop Shaw Pitman LLP (57) ABSTRACT

A laminated vehicle glazing with includes a first extraclear glass sheet forming an exterior glazing, a lamination interlayer and a second glass sheet forming an interior glazing with a traversing hole in these last two.

20 Claims, 4 Drawing Sheets

(52) U.S. Cl.
CPC .............. *B32B 27/08* (2013.01); *B32B 27/30* (2013.01); *B60J 1/001* (2013.01); *B60J 3/007* (2013.01); *C03C 17/3644* (2013.01); *C03C 17/3657* (2013.01); *B32B 3/263* (2013.01); *B32B 27/36* (2013.01); *B32B 2255/06* (2013.01); *B32B 2255/20* (2013.01); *B32B 2307/40* (2013.01); *B32B 2307/402* (2013.01); *B32B 2605/00* (2013.01); *B60R 11/04* (2013.01); *C03C 2217/213* (2013.01); *C03C 2217/256* (2013.01); *C03C 2217/73* (2013.01)

(58) Field of Classification Search
CPC ............ B32B 2315/08; B32B 2329/06; B32B 2605/006; B32B 2605/08; B32B 17/10587; B32B 17/1055; B32B 17/10779; B32B 27/22; B32B 27/306; C08J 5/18; C08J 2329/14; G02B 2027/012; G02B 27/01; B60J 1/001; B60J 1/02
USPC .......................... 428/131, 137, 138, 156, 172
See application file for complete search history.

(56) References Cited

U.S. PATENT DOCUMENTS

| | | | | |
|---|---|---|---|---|
| 2004/0160688 | A1* | 8/2004 | Noguchi | ............. B32B 17/1066 |
| | | | | 359/879 |
| 2004/0258929 | A1 | 12/2004 | Glaubitt et al. | |
| 2010/0101649 | A1* | 4/2010 | Huignard | .......... B32B 17/10036 |
| | | | | 428/158 |
| 2019/0061641 | A1* | 2/2019 | Kikuchi | ..................... B60J 1/00 |
| 2021/0362476 | A1* | 11/2021 | Li | ............................. B60J 1/001 |

FOREIGN PATENT DOCUMENTS

| | | | | |
|---|---|---|---|---|
| CN | 201808255 U | 4/2011 | | |
| CN | 105073667 A | 11/2015 | | |
| CN | 107234945 A | 10/2017 | | |
| CN | 108947236 A | 12/2018 | | |
| CN | 109070703 A | 12/2018 | | |
| CN | 109641786 A | 4/2019 | | |
| EP | 1 329 433 A1 | 7/2003 | | |
| EP | 1 464 632 A1 | 10/2004 | | |
| EP | 2848595 A1 * | 3/2015 | ....... B32B 17/10036 |
| JP | 2006-327381 A | 12/2006 | | |
| JP | 2016-168996 A | 9/2016 | | |
| WO | WO 2004/025334 | 3/2004 | | |
| WO | WO 2005/049757 A1 | 6/2005 | | |
| WO | WO 2008/059170 A2 | 5/2008 | | |
| WO | WO 2018/015312 A1 | 1/2018 | | |
| WO | WO 2018/178286 A1 | 10/2018 | | |
| WO | WO-2020007939 A1 * | 1/2020 | ....... B32B 17/10036 |

OTHER PUBLICATIONS

First Office Action and Search Report as issued in Chinese Patent Application No. 202080004296.8, dated Aug. 16, 2022.
Third Office Action and Search Report as issued in Chinese Patent Application No. 202080004296.8, dated Jul. 31, 2023.

* cited by examiner

VEHICLE LAMINATED GLAZING AND DEVICE WITH ASSOCIATED NEAR INFRARED VIEWING SYSTEM

CROSS-REFERENCE TO RELATED APPLICATIONS

This application is the U.S. National Stage of PCT/EP2020/076099, filed Sep. 18, 2020, which in turn claims priority to French patent application number 1910385 filed Sep. 20, 2019. The content of these applications are incorporated herein by reference in their entireties.

The invention relates to a laminated glazing, in particular a windshield, in a vehicle, in particular a road vehicle or a train, in association with a system for viewing in the near infrared. The invention also describes a device combining said glazing and the viewing system.

Glazings for autonomous vehicles and the associated technology are constantly evolving, in particular in order to improve safety.

Remote sensing by laser or LIDAR, an acronym for the expression "light detection and ranging" or "laser detection and ranging", can be used in autonomous vehicles at the headlights.

More recently, the patent application WO20180153012 proposes to place a LIDAR operating in the near infrared between 750 nm and 1050 nm behind the laminated windshield comprising two sheets of extraclear glass and an infrared filter.

The performance qualities of this viewing device (glazing associated with LIDAR) can be improved.

More broadly, the invention is also targeted at a device with a system for viewing in the infrared and in the visible region, i.e. a multispectral device.

More specifically, the present invention relates to a laminated (and/or bent) glazing fora vehicle, in particular a road vehicle (car, truck, public transport: bus, coach, and the like) or rail vehicle (especially having a maximum speed of at most 90 km/h or of at most 70 km/h, in particular subways or tramways), in particular a bent glazing, especially a windshield, or also a rear window, indeed even a side window, of given thickness E1, for example subcentimetric thickness, in particular of at most 5 mm for a road vehicle windshield, which glazing comprises:
  a first glass sheet, which is in particular bent, intended to be the exterior glazing, with a first external main face F1 and a second internal main face F2 oriented toward the passenger compartment, if a motor vehicle with a thickness preferably of at most 4 mm, and even of at most 3 mm or 2.5 mm—in particular 2.1 mm, 1.9 mm, 1.8 mm, 1.6 mm and 1.4 mm—and preferably of at least 0.7 mm or 1 mm
  a lamination interlayer (single- or multisheet), optionally neutral, clear, extraclear or tinted, in particular gray or green, made of polymer material, preferably thermoplastic polymer material, and better still made of polyvinyl butyral (PVB), preferably, if a road vehicle, with a thickness of at most 1.8 mm, better still of at most 1.2 mm and even of at most 0.9 mm (and better still of at least 0.3 mm and even of at least 0.6 mm), the lamination interlayer being optionally acoustic and/or having optionally a cross section decreasing in wedge shape from the top to the bottom of the laminated glazing (in particular a windshield) for a head-up display (HUD), a lamination interlayer with a main face Fa oriented toward F2 and with a main face Fb opposite to Fa
  a second glass sheet intended to be the interior glazing, which is preferably bent and in particular tinted, with a third main face F3 on the F2 side and a fourth internal main face F4 oriented toward the passenger compartment, if a road vehicle with a thickness preferably less than that of the first glazing, even of at most 3 mm or 2 mm—in particular 1.9 mm, 1.8 mm, 1.6 mm and 1.4 mm—or even of at most 1.3 mm, and preferably of at least 0.7 mm, the thickness of the first and second glass sheets being preferably strictly less than 5 or 4 mm, even than 3.7 mm.

The first glass sheet comprises, on the face F2, an antireflective coating, preferably local, antireflective at at least one "working" wavelength in the infrared in a range extending from 800 nm to 1800 nm, in particular between 850 nm and 1600 nm, with a surface which is free (not covered by the lamination interlayer and the second glass sheet) by means of a traversing hole in the thickness of the interlayer and in the thickness of the second glass sheet.

The first glass sheet, in particular based on silica, soda-lime, soda-lime-silica (preferably), or aluminosilicate, or borosilicate, exhibits a content by weight of total iron oxide (expressed in the form $Fe_2O_3$) of at most 0.05% (500 ppm), preferably of at most 0.03% (300 ppm) and of at most 0.015% (150 ppm) and in particular of greater than or equal to 0.005%.

The second glass sheet in particular based on silica, soda-lime, preferably sodo-lime-silica (and like the first glass sheet), indeed even aluminosilicate, or borosilicate, exhibits a content by weight of total iron oxide (expressed in the form $Fe_2O_3$) of at least 0.4% aid preferably of at most 1.5%.

Thus, according to the invention, in order to achieve a high level of transmission, the following are selected:
  1) an exterior glass extraclear in the targeted near infrared,
  2) an interior glass more absorbent in the targeted near infrared and necessarily hollowed out
  3) a lamination interlayer hollowed out in order to be able to take advantage of an antireflective coating on the face F2 in the targeted near infrared.

This solution is more effective than that of the prior art based on two entire extraclear glasses.

In addition, by avoiding the use of a second extraclear glass, it improves comfort (heat in the vehicle) and the esthetics and is more economical.

The invention is very particularly suitable for glazings (windshield, back window, and the like) in autonomous or semiautonomous vehicles: level L2+, L3, L4 and L5 (full autonomous), as well as vehicles of the Robot Taxi and Shuttle type, and the like.

Iron oxide, present as an impurity in the majority of natural raw materials used in glassmaking (sand, feldspar, limestone, dolomite, and the like), absorbs both in the visible and near ultraviolet region (absorption due to the ferric $Fe^{3+}$ion) and especially in the visible and near infrared region (absorption due to the ferrous $Fe^{2+}$ion); this is why the iron oxide is reduced in the first glass sheet.

In the second glass sheet, it is thus possible to choose a higher content of iron oxide.

Advantageously, the assembly first glass sheet with said antireflective coating exhibits:
  a total transmission of at least 90.0%, 91.0%, or even 92.0% or 92.3%, at the working wavelength, in particular 905±5 nm and/or 1550±5 nm, measured at the normal)(90°) or even preferably also at 60° or even as far as 60°, with respect to the (local) plane of the first sheet, for example on the face F2 side and/or on the face F1 side and/or the antireflective coating increases by at least 1%, 2% or 2.5% or even 3.0%, at the working wavelength, the total transmission of the first glass sheet measured at the normal)(90°) or even preferably also at 60° and even as far as 60°, with respect to the (local) plane of the first sheet, for example on the face F2 side and/or on the face F1 side.

The angle of the glazing, in particular a road vehicle windshield, can typically be between 21° and 36°, with respect to the ground, and on average 30°. Consequently, a high transmission at 60° is particularly advantageous because this is the angle of incidence of the beam of the LIDAR on the windshield if the latter is at 30° from the ground.

The transmission in the infrared is measured, for example, with a Fourier spectrometer, such as the BrukerVertex-70.

Naturally, if a multispectral viewing system is used, it may also be desirable for the assembly first glass sheet with said antireflective coating to exhibit:

a total transmission of at least 90%, 91%, or even 92%, at another working wavelength in the visible region, in particular between 500 nm and 600 nm, measured at the normal or even preferably from 90° as far as 60°, with respect to the plane of the first sheet, for example on the face F2 side and/or on the face F1 side and/or the antireflective coating increases by at least 1%, 2% or 2.5% or even 3%, at the second working wavelength, the total transmission of the first glass sheet, measured at the normal or even preferably from 90° as far as 60°, with respect to the plane of the first sheet, for example on the face F2 side and/or on the face F1 side.

In order to quantify the transmission of the glass in the visible region, there is often defined a light transmission factor, called light transmission, often abbreviated to "$T_L$", calculated between 380 and 780 nm and brought back to a glass thickness of 3.2 mm or 4 mm, according to standard ISO 9050: 2003, thus taking into consideration the illuminant D65, as defined by standard ISO/CIE 10526, and the C.I.E 1931 standard colorimetric observer, as defined by the standard ISO/CIE 10527.

Naturally, the light transmission $T_L$ of the laminated glazing in a zone without a hole (central zone of the windshield) is preferably at least 70% or 75%, 80% or 85% or 88%.

The second glass sheet is in particular green, blue or gray. The second glass sheet can be green with $Fe_2O_3$ or also blue with CoO and Se or gray with Se and CoO.

Mention may in particular be made of the glasses of the applicant company denoted TSAnx (0.5 to 0.6% of iron), TSA2+, TSA3+ (0.8 to 0.9% of iron), TSA4+ (1% of iron) or TSA5+, which for example are green.

TSA3+ (2.1 mm), for example, has a total transmission at 905 nm of approximately 40% and at 1550 nm of approximately 50%.

The second glass sheet can exhibit a redox, being defined as being the ratio of the content by weight of FeO (ferrous iron) to the content by weight of total iron oxide (expressed in the form $Fe_2O_3$), between 0.22 and 0.35 or 0.30.

Said second glass sheet can have a chemical composition which comprises the following constituents in a content varying within the limits by weight defined below:

| | |
|---|---|
| $SiO_2$ | 64-75% |
| $Al_2O_3$ | 0-5% |
| $B_2O_3$ | 0-5% |
| CaO | 2-15% |
| MgO | 0-5% |
| $Na_2O$ | 9-18% |
| $K_2O$ | 0-5% |
| $SO_3$ | 0.1-0.35% |
| $Fe_2O_3$ (total iron) | at least 0.4% and even 0.4% |
| optionally redox | to 1.5%, 0.22-0.3% | and in particular less than 0.1% of impurities.

The traversing hole is thus composed:
of a first traversing hole in the lamination interlayer (single- or multisheets) of width D1
and of a second traversing hole in the second glass sheet of width D2. The first and second holes have the same or similar axes of symmetry and preferably have identical widths (before and even after lamination).

The traversing hole (first and second hole) can be:
closed hole (surrounded by the wall of the second glass sheet), thus within the glazing, in particular spaced from the closest edge face of the glazing by at least 3 cm or 5 cm
open or emerging, forming a notch (peripheral).

The traversing hole is preferably in a peripheral zone of the laminated glazing, preferably at the upper longitudinal edge and/or in a peripheral central region, and the antireflective coating is local and in this peripheral region.

The traversing hole exhibits a given shape, in particular of convex cross section, for example trapezoidal or rectangular or round or oval. The antireflective coating can exhibit a homothetic shape.

If necessary, it is possible to envisage several traversing holes (2, 3 holes) in the interlayer and the second glass sheet of identical shape and/or dimensions, for example side by side in this peripheral zone in particular. The face F2 then comprises a common antireflective coating with a free surface in all the holes or a separate local antireflective (AR) coating for each hole, and for example the local AR coatings exhibit separate thicknesses.

The shape and the dimensions of the traversing hole are configured according to the techniques of the art so as to collect effectively and selectively all the radiation passing through the glazing (windshield, back window, and the like), in particular, in the case of LIDAR, that resulting from a solid angle range outside the vehicle and originating from the zone in front of the vehicle which it is desired to capture via LIDAR.

For example, the hole is of the same shape as the infrared viewing system, such as LIDAR.

The hole (open or closed) can in particular be of convex cross section, especially preferably trapezoidal cross section, or also circular or oval or elliptical or even rectangular, square, and the like, cross section.

If the hole is a notch, a portion of this notch will be masked by the frame of the glazing and thus nonfunctional for the viewing system. If the hole is closed is too close to the edge it is the same.

If the hole is closed, the edge of the hole closest to the edge face of the glazing (upper longitudinal edge preferably and in particular in a central zone) is distant from this edge face of the glazing (of the second sheet) preferably by at least 2 cm or 3 cm and better still 5 cm.

The hole can be in the central zone of the upper longitudinal edge of the windshield, the usual zone of the interior rear-view mirror (adjacent to the hole or rear-view mirror removed depending on the vehicles), a zone where the masking layer on the face F2 and/or Fa is generally thicker than on the side zones bordering the upper edge (passenger, driver, and the like).

Preferably, the hole exhibits a section, in particular trapezoidal or of disk or oval type,—with a smaller dimension of at least 5 cm (suited to the size of the infrared viewing system, for example)—and preferably with a larger dimension (in particular large side or diameter) of at most 40 cm, 30 cm, 25 cm or 20 cm (for mechanical aspects)

and preferably the antireflective coating occupies a surface area encompassing the hole and with a length of at most 40 cm or 30 cm.

In particular, the section is a quadrilateral, especially a rectangle or a trapezoid, with:

a first "upper" (large) side or longitudinal edge (the closest to the edge face of the upper longitudinal edge of the glazing), preferably parallel to the edge face of the upper longitudinal edge of the glazing and with a length preferably of at most 30 cm, 20 cm or 15 cm or 12 cm and in particular spaced at least 5 cm or 6 cm from the edge face (of the upper longitudinal edge of the glazing)

a second "lower" (large) side or longitudinal edge (the furthest from the edge face of the upper longitudinal edge of the glazing, closer to the central zone), preferably parallel to the edge face of the upper longitudinal edge of the glazing and with a length preferably of at most 35 cm or 30 cm or 25 cm or 20 cm and preferably larger than that of the first large side with a height (between these first and second large sides) preferably of at least 5 cm and even of at most 15 cm.

Alternatively, the traversing hole is along a side edge.

In the case of a back window, the traversing hole can be peripheral along a longitudinal (in particular upper) or side edge.

Naturally, the traversing hole is an empty space or at least a space which is not filled (in its central part) by any material which absorbs in the targeted near infrared which would be between the antireflective coating and the infrared viewing system.

However, it is possible to provide an insert (closed, open) of the ring type (monolithic or in several unconnected or connected pieces, and the like), in particular with a width of at most 1.5 cm, for example made of flexible polymer material (polycarbonate, polyamide, polyolefin, polypropylene, and the like):

mounted on (in particular adhesively bonded or by force) the wall of the second glass sheet delimiting (in the top part) the hole indeed even also in contact with the wall of the lamination interlayer and even on the face F2.

This insert can extend beyond the hole, in particular over the face F4.

This insert can be used:

to place in the hole all or part of the infrared viewing system or intermediate optics between the antireflective coating and the infrared viewing system to place in the hole all or part of the means for fixing the infrared viewing system.

If the hole of the interlayer is made before laminating and the insert is placed before laminating at the level of the interlayer (in particular at the most 150° C. and under pressure in particular), this insert to serve to prevent or reduce the creep of the interlayer over the free surface of the antireflective coating.

The antireflective coating, which is in particular local, can preferably overstep by at most 100 mm, 50 mm, 30 mm or 20 mm or 10 mm between the face F2 and the face Fa. The antireflective coating can comprise a stack of thin dielectric layers (of metal or silicon oxides and/or nitrides, for example) alternating high and low refractive indices (at the working wavelength).

The antireflective coating preferably comprises a (functional) porous silica layer, preferably a sol-gel layer.

In a first embodiment, the pores are the interstices of a noncompact stack of nanometric beads, in particular of silica, this layer being described, for example, in the document US20040258929.

In a second embodiment, the porous layer is obtained by the deposition of a condensed silica sol (silica oligomers) densified by vapors of $NH_3$ type, this layer being described, for example, in the document WO2005049757.

In a third embodiment, the porous layer can also be of sol-gel type such as as described in the document EP1329433. The porous layer can also be obtained with other known pore-forming agents: micelles of cationic surfactant molecules in solution and, optionally, in hydrolyzed form, or of anionic or nonionic surfactants, or amphiphilic molecules, for example block copolymers.

In a fourth embodiment, the porous layer can also be of sol-gel type such as as described in the document WO2008/059170. The porous layer can thus be obtained with pore-forming agents which are preferably polymeric beads.

The antireflective coating in particular of porous silica according to the invention can have a thickness advantageously of between 10 nm and 10 μm (these limiting values being included), in particular 50 nm and 1 μm and more preferentially still between 70 and 500 nm.

The porous silica layer can exhibit closed pores of at least 20 nm, 50 nm or 80 nm; optionally, the functional layer can comprise pores with a concentration which increases in the direction of the free surface.

The pores can have an elongated shape, in particular a rice grain shape. More preferentially still, the pores can have a substantially spherical or oval shape. It is preferred for the majority of the closed pores, indeed even at least 80% of them, to have a given shape which is substantially identical, in particular elongated, substantially spherical or oval.

The porous silica can be doped, for example, in order to yet further improve its hydrolytic behavior in the case of applications where good resistance is required (facades, exteriors, and the like). The dopant elements can preferably be chosen from Al, Zr, B, Sn or Zn. The dopant is introduced in order to replace the Si atoms in a molar percentage which can preferably reach 10%, more preferentially still up to 5%.

The antireflective coating can comprise a chemical protection underlayer, in particular with a thickness of at most 200 nm, for example, in particular a dense silica layer, by the sol-gel process, surmounted by a sol-gel porous silica functional layer.

The underlayer can be based on silica or on at least partially oxidized derivatives of silicon chosen from silicon dioxide, substoichiometric silicon oxides, or silicon oxycarbide, oxynitride or oxycarbonitride.

The underlayer proves to be of use when the underlying surface is made of soda-lime-silica glass because it acts as barrier to alkalis.

This underlayer thus advantageously comprises Si, O, optionally carbon and nitrogen. However, it can also comprise minor materials with respect to the silicon, for example metals such as Al, Zn or Zr. The underlayer can be deposited by the sol-gel process or by pyrolysis, in particular by gas phase pyrolysis (CVD). This latter technique makes it possible to obtain layers made of $SiO_xC_y$ or of $SiO_2$ quite easily, in particular by deposition directly on the float glass ribbon in the case of glass substrates. However, the deposition can also be carried out by a vacuum technique, for example by cathode sputtering from an (optionally doped) Si target or from a target made of silicon suboxide (in a reactive oxidizing and/or nitriding atmosphere, for example). This underlayer preferably has a thickness of at least 5 nm, in particular a thickness of between 10 nm and 200 nm, for example between 80 nm and 120 nm.

The antireflective coating can also comprise an overlayer if it does not detrimentally affect the antireflective properties.

It is also possible to put an antireflective coating also on face F1 opposite that on face F2.

The antireflective coating can have the same shape as the section of the hole, for example trapezoidal or also rectangular, and the like.

Although less preferred a priori, the antireflective coating can be solely in a central zone facing said traversing hole; it does not overstep the traversing hole and even is spaced from the edge of the traversing hole, preferably by at most 1 cm. For example, the free surface in the traversing hole exhibits a length and/or a side of at least 5 cm, 10 cm, 15 cm and preferably of at most 30 cm.

The glazing can comprise, between the face F2 and Fa, an opaque masking layer, in particular an enamel (black, and the like), on the face F2 and/or on the face Fa (especially, on Fa, an ink, in particular a black ink, and the like), along the edge of the traversing hole between the face F2 and Fa, in particular in the peripheral and even central zone and preferably along the longitudinal edge of the glazing, the antireflective coating (in particular the porous silica layer or an optional dense silica underlayer) being in contact with the opaque masking layer.

The masking layer is, for example, on face F2 and the antireflective coating is on the masking layer or under the masking layer and/or the masking layer is on the face Fa and the antireflective coating is in contact with the masking layer.

The masking layer exhibits a gap in line with said traversing hole (at least in the central zone) and preferably oversteps by at most 30 mm or 20 mm or 10 mm or 5 mm in said traversing hole and/or leaves the antireflective coating with the free surface in the hole, a free surface (not coated with masking layer) exhibiting a length of at least 5 cm, 10 cm, 15 cm and preferably of at most 30 cm.

This masking layer will mask the infrared viewing system and for example its housing.

A masking layer can be a layer printed on the lamination interlayer, for example on the PVB.

The antireflective coating (in particular the porous silica layer or an optional dense silica underlayer) can also be spaced from the masking layer (for example which is on face F2, in particular enamel) or at least does not cover it.

The opaque masking layer is preferably a continuous layer (flat tint with a solid edge or alternatively a graduated edge (set of patterns)).

The masking layer can be at 2 mm or 3 mm (less than 5 mm) from the edge face of the glazing (the closest).

The masking layer can be a strip framing the glazing (windshield, and the like), in particular made of black enamel. A gap is thus created in this masking layer.

Another masking layer (enamel, in particular black enamel, and the like) can be on face F3 or F4, in particular facing the masking layer (and even of identical nature, for example an enamel, in particular a black enamel).

The glazing can comprise metal wires, in particular heating wires, on the face Fb side, in particular anchored to the face Fb and preferably absent in said hole.

It may be desired to prevent the heating wires facing the hole.

The heating wires in particular have a thickness of less than or equal to 0.1 mm, preferably of copper, tungsten, gold, silver or aluminum or alloys of at least two of these metals.

In one embodiment, a heating zone of the glazing comprises a plurality of individual metal wires, called "heating metal wires", which connect "busbars" together. The heating current passes through these individual metal wires. The wires are advantageously very thin, so as not to, or only to very slightly, damage the transparency of the glazing. Preferably, the metal wires have a thickness of less than or equal to 0.1 mm, in particular of between 0.02 and 0.04 mm, and ideally between 0.024 mm and 0.029 mm. The meta wires preferably contain copper, tungsten, gold, silver or aluminum or an alloy of at least two of these metals. The alloy can also contain molybdenum, rhenium, osmium, iridium, palladium or platinum.

The metal wires are preferably electrically insulated.

For the glass of the first glass sheet and/or of the second glass sheet, it is preferably a glass of the soda-lime-silica type.

The interior and/or exterior glass may have undergone a chemical or heat treatment of the hardening or annealing type or a tempering (in particular for better mechanical strength) or be semitempered.

The glass of the first glass sheet and/or of the second glass sheet is preferably of the float glass type, that is to say capable of having been obtained by a process consisting in pouring the molten glass onto a bath of molten tin (float bath). "Atmosphere" and "tin" faces is understood to mean the faces which have been respectively in contact with the atmosphere prevailing in the float bath and in contact with the molten tin. The tin face contains a small superficial amount of tin which has diffused into the structure of the glass.

The face F2 with the antireflective coating can equally well be the "tin" face the "atmosphere" face.

The first glass sheet can be, for example, a soda-lime-silica glass, such as the Diamant® glass from Saint-Gobain Glass, or Optiwhite® from Pilkington, or B270® from Schott, or Sunmax® from AGC, or of other composition described in the document WO04/025334.

The Planiclear® glass from the company Saint-Gobain Glass can also be chosen.

With ordinary natural starting materials, the total content by weight of iron oxide is of the order of 0.1% (1000 ppm). Particularly pure starting materials can be chosen in order to lower the content of iron oxide.

In the present invention, the $Fe_2O_3$ (total iron) content of the first glass sheet is preferably less than 0.015%, indeed even less than or equal to 0.012%, in particular 0.010%, in order to increase the near infrared transmission of the glass. The $Fe_2O_3$ content is preferably greater than or equal to 0.005%, in particular 0.008%, in order not to excessively penalize the cost of the glass.

In order to increase even more the transmission of the first glass sheet in the infrared, it is possible to reduce the content of ferrous iron in favor of the content of ferric iron, thus to oxidize the iron present in the glass. Glasses having the lowest possible "redox", ideally zero or virtually zero, are thus targeted. This number can vary between 0 and 0.9, zero redox values corresponding to a fully oxidized glass.

Glasses comprising low amounts of iron oxide, in particular less than 200 ppm, indeed even less than 150 ppm, have a natural tendency to exhibit high redox values, of greater than 0.4, indeed even than 0.5. This tendency is probably due to a shift in the oxidation/reduction equilibrium of the iron as a function of the iron oxide content.

The redox of the first glass sheet is preferably greater than or equal to 0.15, and in particular between 0.2 and 0.30, in particular between 0.25 and 0.30. This is because excessively low redox values contribute to the reduction in the lifetime of the furnaces.

In the glasses according to the invention (first and second sheet), the silica $SiO_2$ is generally kept within narrow limits for the following reasons. Above 75%, the viscosity of the glass and its aptitude for devitrification increase sharply, which makes it more difficult to melt it and to pour it onto the bath of molten tin. Below 60%, in particular 64%, the hydrolytic resistance of the glass rapidly decreases. The preferred content is between 65% and 75%, in particular between 71% and 73%.

Said first glass sheet can have a chemical composition which comprises the following constituents in a content varying within the limits by weight defined below:

| | |
|---|---|
| $SiO_2$ | 60-75% |
| $Al_2O_3$ | 0-10% |
| $B_2O_3$ | 0-5%, preferably 0% |
| CaO | 5-15% |
| MgO | 0-10% |
| $Na_2O$ | 5-20% |
| $K_2O$ | 0-10% |
| BaO | 0-5%, preferably 0%, |
| $SO_3$ | 0.1-0.4% |
| $Fe_2O_3$ (total iron) | 0% to 0.015%, |
| and redox | 0.1-0.3. |

Throughout the text, the percentages are percentages by weight.

The glass sheets are preferably formed by floating on a bath of tin. Other types of forming process can be employed, such as drawing processes, down-draw process, rolling process, Fourcault process, and the like.

The glass composition of the first glass sheet can comprise, in addition to the unavoidable impurities contained in particular in the starting materials, a small proportion (up to 1%) of other constituents, for example agents aiding the melting or the refining of the glass (Cl, and the like), or also elements originating from the dissolution of refractories used in the construction of the furnaces (for example $ZrO_2$). For the reasons already mentioned, the composition according to the invention preferably does not comprise oxides such as $Sb_2O_3$, $As_2O_3$ or $CeO_2$.

The composition of the first glass sheet preferably does not include any agent which absorbs infrared radiation (in particular fora wavelength of between 800 and 1800 nm). In particular, the composition according to the invention preferably does not contain any of the following agents: oxides of transition elements, such as CoO, CuO, $Cr_2O_3$, NiO, $MnO_2$ or $V_2O_5$, oxides of rare earth metals, such as $CeO_2$, $La_2O_3$, $Nd_2O_3$ or $Er_2O_3$, or else coloring agents in the elemental state, such as Se, Ag or Cu. The other agents preferably excluded also include the oxides of the following elements: Sc, Y, Pr, Sm, Eu, Gd, Tb, Dy, Ho, Tm, Yb or Lu. These agents very often have an undesirable very powerful coloring effect, which is apparent at very low contents, sometimes of the order of a few ppm or less (1 ppm=0.0001%). Their presence thus very greatly reduces the transmission of the glass.

Preferably, the first glass sheet exhibits a chemical composition which comprises the following constituents in a content varying within the limits by weight defined below:

| | |
|---|---|
| $SiO_2$ | 60-75% |
| $Al_2O_3$ | 0-10% |
| $B_2O_3$ | 0-5%, preferably 0% |
| CaO | 5-15% |
| MgO | 0-10% |
| $Na_2O$ | 5-20% |
| $K_2O$ | 0-10% |
| BaO | 0-5%, preferably 0%, |
| $SO_3$ | >0.2-0.4% |
| $Fe_2O_3$ (total iron) | 0% to 0.015%, |
| and redox | 0.2-0.30. |

The first glass sheet can exhibit a chemical composition which comprises the following constituents in a content varying within the limits by weight defined below:

| | |
|---|---|
| $SiO_2$ | 60-75% |
| $Al_2O_3$ | 0-10% |
| $B_2O_3$ | 0-5%, preferably 0% |
| CaO | 5-15% |
| MgO | 0-10% |
| $Na_2O$ | 5-20% |
| $K_2O$ | 0-10% |
| BaO | 0-5%, preferably 0%, |
| $SO_3$ | 0.1-0.4% |
| $Fe_2O_3$ (total iron) | 0% to 0.02%, |
| and redox | 0.15-0.3. |

In the present invention, the $Fe_2O_3$ (total iron) content is preferably less than 0.015%, indeed even less than or equal to 0.012%, in particular 0.010%, this being in order to increase the near infrared transmission of the glass. The $Fe_2O_3$ content is preferably greater than or equal to 0.005%, in particular 0.008%, in order not to excessively penalize the cost of the glass.

The redox is preferably greater than or equal to 0.15, and in particular between 0.2 and 0.30, in particular between 0.25 and 0.30. This is because excessively low redox values contribute to the reduction in the lifetime of the furnaces.

In the glasses according to the invention, the silica $SiO_2$ is generally kept within narrow limits for the following reasons. Above 75%, the viscosity of the glass and its aptitude for devitrification increase sharply, which makes it more difficult to melt it and to pour it onto the bath of molten tin. Below 60%, in particular 64%, the hydrolytic resistance of the glass rapidly decreases. The preferred content is between 65% and 75%, in particular between 71% and 73%.

Other preferred compositions according to the invention are reproduced below:

| | |
|---|---|
| $SiO_2$ | 65-75% |
| $Al_2O_3$ | 0-3% |
| CaO | 7-12% |
| MgO | 2-5% |
| $Na_2O$ | 10-15% |
| $K_2O$ | 0-5% |
| $SO_3$ | 0.1-0.3% |
| $Fe_2O_3$ (total iron) | 0% to less than 0.015%, |
| and redox | 0.1-0.3. |

Other preferred compositions according to the invention are reproduced below:

| | |
|---|---|
| SiO₂ | 65-75% |
| Al₂O₃ | 0-5% |
| CaO | 7-12% |
| MgO | 1-5% |
| Na₂O | 10-15% |
| K₂O | 0-5% |
| SO₃ | 0.2-0.4% |
| Fe₂O₃ (total iron) | 0% to less than 0.015%, |
| and redox | 0.1-0.3. |

Without departing from the scope of the invention, the interlayer can, of course, comprise several sheets made of thermoplastic material of different natures, for example of different hardnesses in order to provide an acoustic function, such as, for example, described in the publication U.S. Pat. No. 6,132,882, in particular a set of PVB sheets of different hardnesses. Likewise, one of the glass sheets may be thinned with respect to the thicknesses conventionally used.

The interlayer can, according to the invention, exhibit a wedge shape, in particular for the purpose of an HUD (head-up display) application. Furthermore, one of the sheets of the interlayer can be tinted in its bulk.

Mention may be made, as ordinary lamination interlayer, in addition to PVB, of flexible used polyurethane PU, a plasticizer-free thermoplastic, such as ethylene/vinyl acetate (EVA) copolymer, an ionomer resin. These plastics have, for example, a thickness between 0.2 mm and 1.1 mm, in particular between 0.3 and 0.7 mm.

The lamination interlayer can comprise another functional plastic film (transparent, clear or tinted), for example a film made of poly(ethylene terephthalate) PET carrying an electrically conductive athermal layer, and the like; for example, there is PVB/functional film/PVB between the faces F2 and F3.

The transparent plastic film can have a thickness of between 10 and 100 µm. The transparent plastic film can be more broadly made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A clear film is preferred, in particular PET.

For instance, use may be made, for example, of a clear coated PET film, for example XIR from the company Eastman, a coextruded PET/PMMA film, for example of the SRF 3M® type, but also numerous other films (for example made of PC, PE, PEN, PMMA, PVC), which are visually as transparent as possible and which are not modified, in the autoclave, as regards their surface and their consistency.

In order to limit heating in the passenger compartment or to limit the use of air conditioning, one of the glass sheets at least (preferably the exterior glass) is tinted, and the laminated glazing can also comprise a layer which reflects or absorbs solar radiation, preferably on face F4 or on face F2 or F3, in particular a transparent electrically conductive oxide layer referred to as TCO layer (on face F4) or even a stack of thin layers comprising at least one TCO layer, or of stacks of thin layers comprising at least one silver layer (on F2 or F3), the or each silver layer being positioned between dielectric layers.

It is possible to simultaneously have a (silver-containing) layer on face F2 and/or F3 and a TCO layer on face F4.

The TCO layer (layer of a transparent electrically conductive oxide) is preferably a layer of fluorine-doped tin oxide ($SnO_2$:F) or a layer of mixed indium tin oxide (ITO).

Naturally, the most desired application is for the glazing to be a windshield of a road vehicle (automobile) or even a (moderate speed) rail vehicle.

The glazing can thus comprise, on the face F2, an athermal, in particular electrically conductive, optionally heating, functional layer, especially a stack comprising silver, which is absent from said traversing hole at least in the central zone and present along the edge of the traversing hole between the face F2 and Fa, the antireflective coating optionally being in contact with the functional layer, in particular on or under the athermal functional layer.

The invention also relates to a device which comprises:
the glazing as described above
a system for infrared viewing at said working wavelength, indeed even a multispectral system, in the visible region, in particular between 500 and 600 nm, positioned in the passenger compartment behind said glazing so as to send and/or receive radiation after passing through the first glass sheet at the level of said traversing hole.

Certain advantageous but nonlimiting embodiments of the present invention are described below, which can, of course, be combined with one another, if appropriate.

Figure 1:
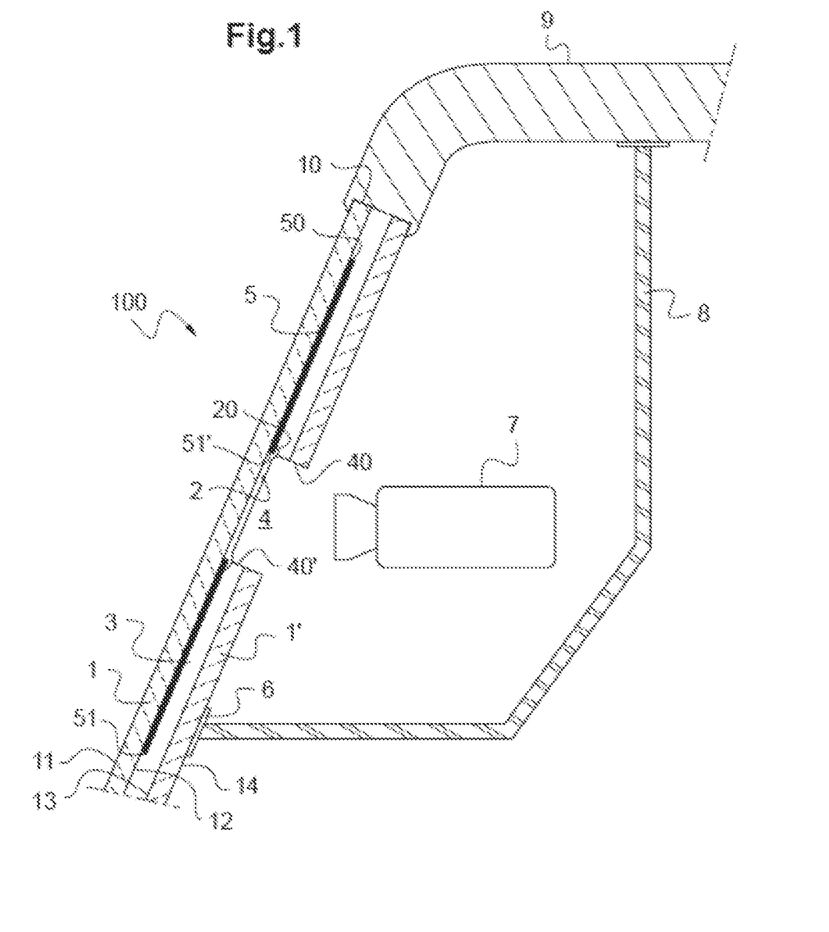
FIG. 1 diagrammatically represents, in sectional view, a windshield 100 in a first embodiment of the invention with an infrared viewing system, such as a LIDAR.

FIG. 1 diagrammatically represents a windshield 100 according to the invention, in section with a system for infrared viewing, such as a LIDAR, at 905 nm or 1550 nm. It can also be a multispectral system which can work in the visible region and up to 1800 nm.

This viewing system 7 is placed behind the windshield facing a zone which is preferably located in the central and upper part of the windshield. In this zone, the infrared viewing system 7 is oriented with a certain angle with respect to the surface of the windshield (face F2). In particular, the LIDAR can be oriented directly toward the image capture zone, along a direction close to the parallel with the ground, that is to say slightly inclined toward the road. In other words, the LIDAR 7 can be oriented toward the road along a low angle with a field of view suitable for fulfilling its functions.

The windshield is a conventional laminated glazing comprising:
an external glass sheet 1, with exterior face F1 and interior face F2
and an internal glass sheet 1', for example with a thickness or even of 1.6 mm or even less, with exterior face F3 and interior face F4 on the passenger compartment side
the two glass sheets being connected to each other by an interlayer made of thermoplastic material 3, generally made of polyvinyl butyral (PVB), which is preferably clear, with a submillimetric thickness, optionally exhibiting a cross section which decreases in wedge shape from the top toward the bottom of the laminated glazing, for example a PVB (RC41 from Solutia or from Eastman) with a thickness of approximately 0.76 mm, or, in an alternative form, if necessary, an acoustic (three-layer or four-layer) PVB, for example with a thickness of approximately 0.81 mm, for example an interlayer made of three PVB sheets.

In a conventional and well-known way, the windshield is obtained by hot lamination of the elements 1, 2 and 3. A clear PVB of 0.76 mm is chosen.

The first glass sheet comprises, on the face F2, an antireflective coating 2, antireflective at at least one "working" wavelength in the infrared of between 800 nm and 1800 nm, in particular between 850 nm and 1600 nm, with a surface which is free (not covered by the lamination interlayer and the second glass sheet) by means of a traversing hole 4 in the thickness of the interlayer and in the thickness of the second glass sheet, thus a hole delimited by the walls 40 and 40'.

The first glass sheet 1, in particular based on silica, soda-lime, soda-lime-silica (preferably), aluminosilicate or borosilicate, exhibits a content by weight of total iron oxide (expressed in the form of $Fe_2O_3$) of at most 0.05% (500 ppm), preferably of at most 0.03% (300 ppm) and of at most 0.015% (150 ppm) and in particular of greater than or equal to 0.005%. The first glass sheet can exhibit a redox of greater than or equal to 0.15, and in particular of between 0.2 and 0.30, in particular between 0.25 and 0.30.

In particular, an Optiwhite glass of 1.95 mm is chosen.

The second glass sheet 1', in particular based on silica, soda-lime, preferably soda-lime-silica (and like the first glass sheet), indeed even aluminosilicate, or borosilicate, exhibits a content by weight of total iron oxide of at least 0.4% and preferably of at most 1.5%. The second glass sheet can exhibit a redox between 0.22 and 0.35 or 0.30.

Mention may in particular be made of the glasses of the applicant company named TSAnx (0.5 to 0.6% of iron), TSA2+, TSA3+ (0.8 to 0.9% of iron), TSA4+ (1% of iron) or TSA5+, which are for example green. For example, a TSA3+ glass of 1.6 mm is chosen. With an Optiwhite glass of 1.95 mm and an antireflective coating of 110 nm, the following total transmissions on the face F2 side are obtained:

at 90°, of 92.5% at 905 nm and 92.0% at 1550 nm
at 60°, of 91.7% at 905 nm and 91.5% at 1550 nm.

According to the invention, in a peripheral central region along the upper longitudinal edge, the windshield thus comprises a traversing hole 4 in the thickness of the lamination interlayer 3 and of the second glass sheet 1', a hole thus delimited by their respective side walls 40' and 40.

Figure 2:
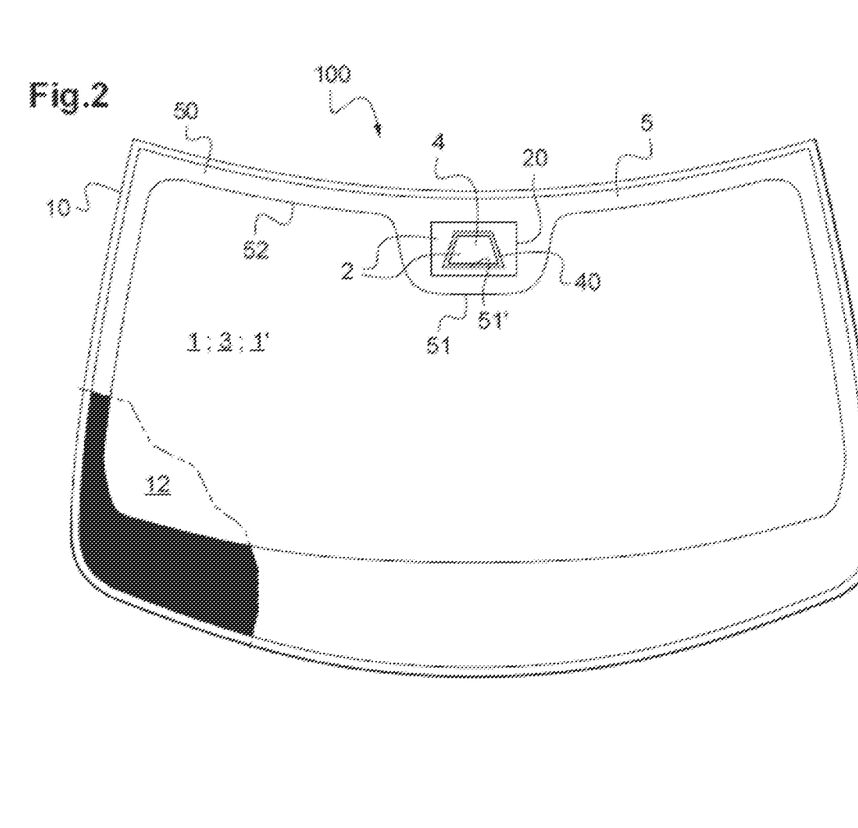
FIG. 2 diagrammatically represents, in front view (passenger compartment side), the windshield 100 of FIG. 1.

As shown in FIGS. 1 and 2, the hole is in this instance a closed hole (framed by the wall of the glass sheet), thus within the glazing in particular—of trapezoidal section— comprising:
  a first "upper" large side or longitudinal edge closest to the edge face of the upper longitudinal edge of the glazing 10—parallel to this edge face with a length of at most 20 cm, for example 10.6 cm, and spaced by at least 5 cm or 6 cm from the edge face (on the large side)
  a second "lower" large side or longitudinal edge (furthest from the edge face of the upper longitudinal edge 10, close to the central zone) parallel to the first large side with a length of at most 25 cm or 20 cm and preferably greater than that of the first large side, for example 17.5 cm—with a height (between the large sides) of at least 5 cm, in this instance of 10 cm.

The infrared viewing system 7 is opposite the traversing hole 4.

The traversing hole 4 can alternatively be a notch, thus an emerging traversing hole preferably on the roof side.

The traversing hole 4 can be in another region of the windshield 100 or even in another glazing of the vehicle, especially the back window.

The antireflective coating 2 is also local. In this instance it is of rectangular shape in this peripheral region and its edges 20 overstep by a maximum of 10 mm the walls delimiting the hole 4 between the face 12 and the face Fa.

The windshield 100 comprises, on the face F2 12, an opaque masking layer, which is for example black, 5, such as an enamel layer or a lacquer, forming a peripheral frame of the windshield (or of the back window) and in the peripheral zone with the traversing hole it comprises a gap 51' large enough not to hamper the performance qualities of the LIDAR 7 but capable of masking the housing 8 (plastic, metal, and the like) of the LIDAR 7. The housing 8 can be adhesively bonded to the face F4 by an adhesive 6 and to the roof 9.

In this instance, the antireflective coating is on the F2 side and covers the masking layer a little.

The windshield 100 can comprise a set of virtually invisible metal wires 5, for example of 50 µm, which are installed on a face Fb on the face F3 side of the lamination interlayer 3 (over the entire surface), in the form of lines which are or are not straight. These wires are absent from the traversing hole 4.

Figure 3:
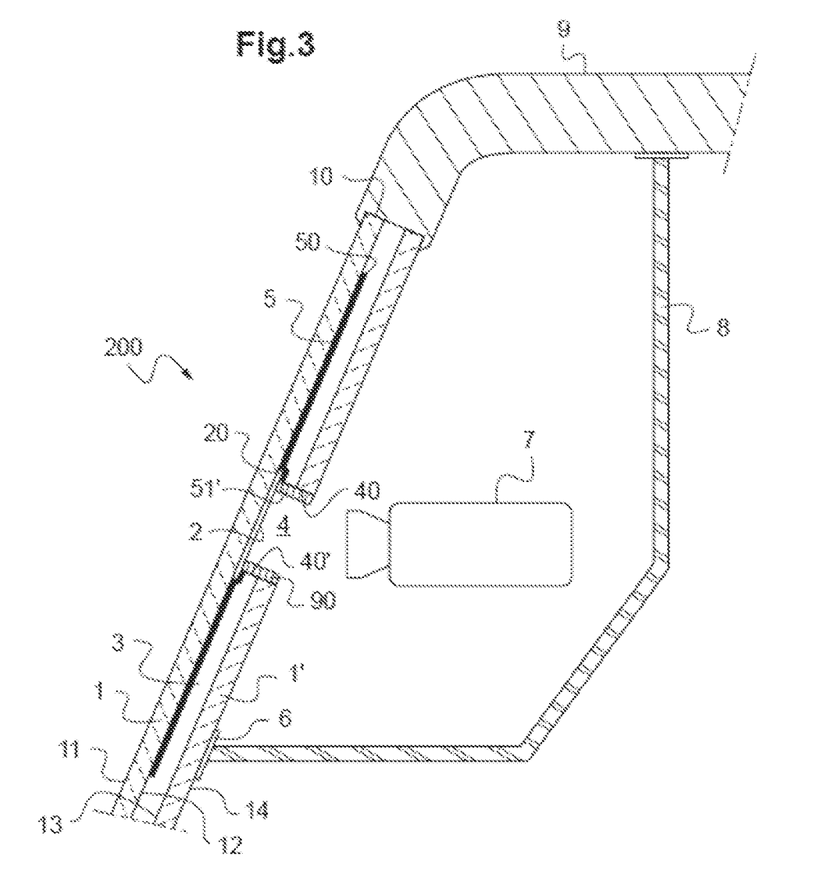
FIG. 3 diagrammatically represents, in sectional view, a windshield 200 according to the invention, in section with an infrared viewing system, such as a LIDAR, in a second embodiment of the invention.
Figure 4:
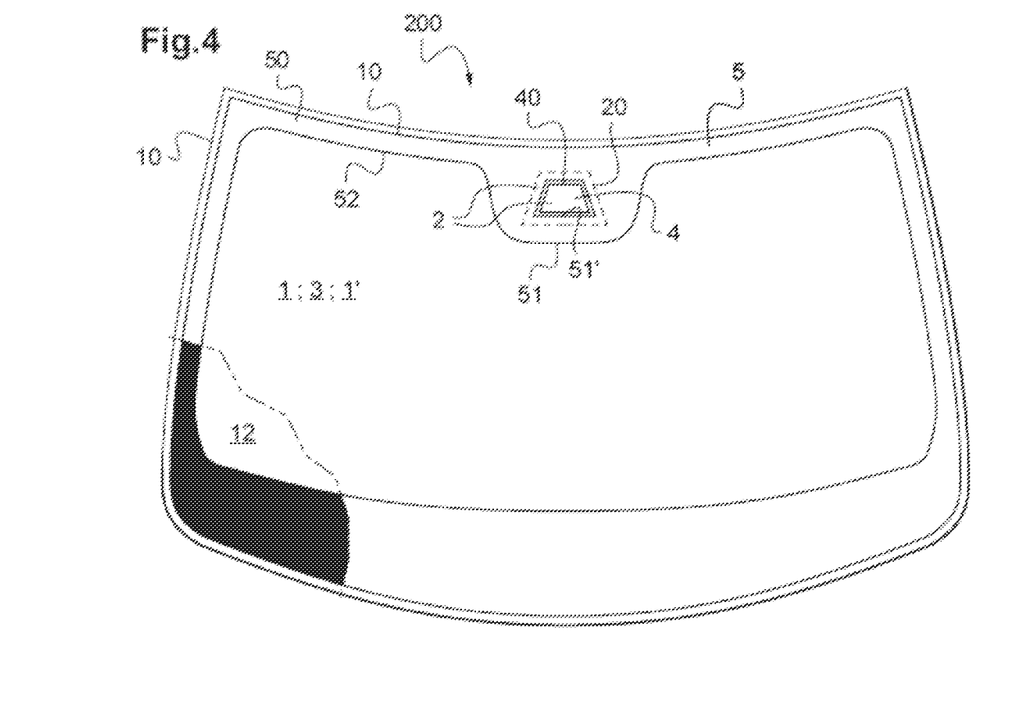
FIG. 4 diagrammatically represents, in front view (passenger compartment side), the windshield 200 of FIG. 3.

FIG. 3 diagrammatically represents, in sectional view, a windshield 200 in section with an infrared viewing system, such as a LIDAR, in a second embodiment of the invention. FIG. 4 diagrammatically represents, in front view (passenger compartment side), the windshield 200 of FIG. 3.

Only the differences from the first embodiment are explained below.

The antireflective coating 2 on the face F2 is this time under the masking layer. The antireflective coating 2 exhibits a shape which is homothetic to that of the section of the hole, thus in this instance of trapezoidal shape (in dotted lines in FIG. 4 because it is not visible), in this peripheral region and its edges 20 overstep by 10 mm the walls delimiting the hole 4 between the face 12 and the face Fa.

An insert 90 of ring type with a width of at most 1.5 cm, for example made of flexible polymer (polycarbonate, and the like) material, is housed in the traversing hole, which insert is mounted on (in particular adhesively bonded or by force) the wall 40 of the second glass sheet delimiting (in the top part) the hole and also in contact with the wall 40' of the lamination interlayer and touches the antireflective coating.

This insert 90 can serve as mechanical reinforcement, and/or for fixing the LIDAR. It can also be used in the first embodiment.

This insert can extend beyond the hole, in particular over the face F4.

In connection with the embodiments presented, possible alternative forms are as follows (without being exhaustive), which can optionally be combined:
  the antireflective coating does not overstep the traversing hole and even is spaced from the edge of the traversing hole, preferably by at most 1 cm
  the antireflective coating is spaced from the masking layer (for example which is on face F2, in particular enamel) or at least does not cover it
  the antireflective coating comprises a chemical protection underlayer, in particular a dense silica layer, in particular by the sol-gel process, surmounted by the sol-gel porous silica functional layer
  the face F2 comprises an athermal functional layer under or on the enamel, the antireflective coating optionally being in contact with the functional layer, in particular on or under the athermal functional layer.

The invention claimed is:

1. A glazing for a vehicle, comprising:
  a first glass sheet configured to form an exterior glazing of the vehicle with a first external main face and a second internal main face configured to be oriented toward a passenger compartment of the vehicle;

a lamination interlayer made of polymer material with a first main face oriented toward the second internal main face and with a second main face opposite to the first main face;

a second glass sheet configured to form an interior glazing of the vehicle with a third external main face oriented toward the second internal main face and a fourth internal main face oriented toward the passenger compartment, wherein:

a traversing hole is arranged in a thickness of the lamination interlayer and in a thickness of the second glass sheet, the first glass sheet comprises, on the second internal main face, an antireflective coating, that is antireflective at at least one working wavelength in the infrared in a range extending from 800 nm to 1800 nm, said antireflective coating being arranged at a bottom of the traversing hole and having a surface which is free and which faces an opening of the traversing hole, the first glass sheet exhibits a content by weight of total iron oxide of at most 0.05%, the second glass sheet exhibits a content by weight of total iron oxide of at least 0.4%, and the antireflective coating is continuous across the entire bottom of the traversing hole and is arranged locally within the glazing, a periphery of the antireflective coating extending beyond a periphery of the traversing hole without overstepping beyond said periphery of the traversing hole by a distance of more than 100 mm, said periphery of the antireflective coating extending beyond the periphery of the traversing hole being arranged between the first glass sheet and the lamination interlayer.

2. The vehicle glazing as claimed in claim 1, wherein an assembly of the first glass sheet with said antireflective coating exhibits a total transmission of at least 90.0% at the working wavelength.

3. The vehicle glazing as claimed in claim 2, wherein an assembly of the first glass sheet with said antireflective coating exhibits a total transmission of at least 91.0% at the working wavelength.

4. The vehicle glazing as claimed in claim 1, wherein the traversing hole is in a peripheral region and the antireflective coating is local in said peripheral region.

5. The vehicle glazing as claimed in claim 4, wherein the traversing hole is in at an upper longitudinal edge region of the vehicle glazing.

6. The vehicle glazing as claimed in claim 1, wherein the traversing hole exhibits a section with a smaller dimension of at least 5 cm.

7. The vehicle glazing as claimed in claim 6, wherein the section is trapezoidal or rectangular or a disk or oval.

8. The vehicle glazing as claimed in claim 1, wherein the traversing hole is closed.

9. The vehicle glazing as claimed in claim 1, wherein an insert is mounted on the traversing hole at least on a wall of the second glass sheet delimiting a part of the traversing hole.

10. The vehicle glazing as claimed in claim 1, wherein the antireflective coating comprises a porous silica layer.

11. The vehicle glazing as claimed in claim 1, wherein the antireflective coating comprises a chemical protection underlayer, surmounted by a porous silica functional layer.

12. The vehicle glazing as claimed in claim 1, further comprising, between the second internal main face and first main face, an opaque masking layer on the second internal main face and/or on the first main face, which masking layer is present along the edge of the traversing hole between the second internal main face and the first main face.

13. The vehicle glazing as claimed in claim 12, wherein the masking layer is on second internal main face and the antireflective coating is on the masking layer or under the masking layer and/or wherein the masking layer is on the first main face and the antireflective coating is in contact with the masking layer.

14. The vehicle glazing as claimed in claim 1, further comprising, between the second internal main face and the first main face, an opaque masking layer on the first internal main face and/or on the first main face, which masking layer is present along an edge of the traversing hole between the first internal main face and the first main face, the antireflective coating is spaced from the masking layer or at least does not cover it.

15. The vehicle glazing as claimed in claim 1, further comprising metal wires on the second main face.

16. The vehicle glazing as claimed in claim 1, further comprising, on the second internal main face, an athermal functional layer, which is absent from said traversing hole at least in the central zone and present along an edge of the traversing hole between the second internal main face and a first main face, the antireflective coating being in contact with the athermal functional layer.

17. The vehicle glazing as claimed in claim 1, wherein the lamination interlayer comprises a PVB film.

18. The vehicle glazing as claimed in claim 1, wherein the vehicle glazing is a glazing of a road or rail vehicle that forms a windshield or a window.

19. A device, comprising:

said vehicle glazing as claimed in claim 1, and a system for infrared viewing at said working wavelength positioned in the passenger compartment behind said vehicle glazing so as to send and/or receive radiation after passing through the first glass sheet at the level of said traversing hole.

20. A glazing for a vehicle, comprising:

a first glass sheet configured to form an exterior glazing of the vehicle with a first external main face and a second internal main face configured to be oriented toward a passenger compartment of the vehicle;

a lamination interlayer made of polymer material with a first main face oriented toward the second internal main face and with a second main face opposite to the first main face;

a second glass sheet configured to form an interior glazing of the vehicle with a third external main face oriented toward the second internal main face and a fourth internal main face oriented toward the passenger compartment, wherein:

a traversing hole is arranged in a thickness of the lamination interlayer and in a thickness of the second glass sheet, the first glass sheet comprises, on the second internal main face, an antireflective coating, that is antireflective at at least one working wavelength in the infrared in a range extending from 800 nm to 1800 nm, said antireflective coating being arranged at a bottom of the traversing hole and having a surface which is free and which faces an opening of the traversing hole, the first glass sheet exhibits a content by weight of total iron oxide of at most 0.05%, the second glass sheet exhibits a content by weight of total iron oxide of at least 0.4%, the antireflective coating is continuous across the entire bottom of the traversing hole and is arranged locally within the glazing without overstepping beyond a periphery of the traversing hole by a distance of more than 100 mm, a periphery of the antireflective coating extending beyond the periphery of the traversing hole being arranged between the first glass sheet and the lamination interlayer, the glazing further comprises a housing for supporting a camera to be positioned in front of the traversing hole and wherein no portion of said housing is in contact with an internal edge of said traversing hole, said internal edge defining the periphery of said traversing hole.

\* \* \* \* \*